United States Patent
Cai et al.

(10) Patent No.: US 8,046,381 B2
(45) Date of Patent: Oct. 25, 2011

(54) IMS NETWORK ACCESS USING LEGACY DEVICES

(75) Inventors: Yigang Cai, Naperville, IL (US); Simon Xu Chen, QingDao (CN); Ivy Qingfang Meng, QingDao (CN); Bill Xiang Yu Qian, QingDao (CN); Alexander Aihao Yin, QingDao (CN); Elsie Shu Fang Zhang, QingDao (CN); Eric Xiaoming Zhao, QingDao (CN)

(73) Assignee: Alcatel Lucent, Paris (FR)

( * ) Notice: Subject to any disclaimer, the term of this patent is extended or adjusted under 35 U.S.C. 154(b) by 543 days.

(21) Appl. No.: 11/114,258

(22) Filed: Apr. 26, 2005

(65) Prior Publication Data

US 2006/0206504 A1    Sep. 14, 2006

(30) Foreign Application Priority Data

Mar. 10, 2005    (CN) .......................... 2005 1 0054440

(51) Int. Cl.
    *G06F 17/00*    (2006.01)
(52) U.S. Cl. ....................................... 707/802; 370/352
(58) Field of Classification Search .................. None
    See application file for complete search history.

(56) References Cited

U.S. PATENT DOCUMENTS

| | | | | |
|---|---|---|---|---|
| 6,643,703 B1 * | 11/2003 | Armistead et al. | ............ | 709/238 |
| 6,674,713 B1 * | 1/2004 | Berg et al. | ...................... | 370/217 |
| 7,173,933 B1 * | 2/2007 | O'Rourke et al. | ............ | 370/389 |
| 7,353,278 B2 * | 4/2008 | Tuunanen et al. | ............ | 709/227 |
| 2001/0031635 A1 * | 10/2001 | Bharatia | ........................ | 455/432 |
| 2002/0110104 A1 * | 8/2002 | Surdila et al. | .................. | 370/338 |
| 2003/0131132 A1 * | 7/2003 | Cheng et al. | ................... | 709/239 |
| 2003/0236896 A1 * | 12/2003 | Isomaki et al. | ................ | 709/229 |
| 2004/0076145 A1 * | 4/2004 | Kauhanen et al. | ............. | 370/352 |
| 2004/0152444 A1 * | 8/2004 | Lialiamou et al. | ............ | 455/406 |
| 2004/0184452 A1 * | 9/2004 | Huotari et al. | ................. | 370/384 |
| 2004/0190689 A1 * | 9/2004 | Benitez Pelaez et al. | .. | 379/88.13 |
| 2004/0246965 A1 * | 12/2004 | Westman et al. | ............. | 370/392 |
| 2005/0190772 A1 * | 9/2005 | Tsai et al. | ................. | 370/395.52 |
| 2005/0286531 A1 * | 12/2005 | Tuohino et al. | ............ | 370/395.2 |
| 2007/0100981 A1 * | 5/2007 | Adamczyk et al. | ........... | 709/223 |
| 2008/0133665 A1 * | 6/2008 | Lybeck et al. | ................ | 709/204 |
| 2008/0316998 A1 * | 12/2008 | Procopio et al. | ............. | 370/352 |

FOREIGN PATENT DOCUMENTS

WO    WO2004008786    1/2004

\* cited by examiner

*Primary Examiner* — Etienne Leroux
*Assistant Examiner* — Thu Nga Nguyen
(74) *Attorney, Agent, or Firm* — Duft, Bornsen & Fishman, LLP

(57) ABSTRACT

A communication network is described that allows legacy devices to access an IMS network. The communication network includes a switching system, an IMS network, and a non-IMS network. The switching system includes a subscriber database that is pre-provisioned with identities of IMS subscribers using legacy devices. When in operation, a calling party places a call through a legacy device. The switching system receives the call and accesses the subscriber database based on a calling party identifier (e.g., a phone number, URL, etc) to determine if the calling party is an IMS subscriber. If the calling party is an IMS subscriber, then the switching system routes the call to the IMS network. If the calling party is not an IMS subscriber, then the switching system routes the call to the non-IMS network.

20 Claims, 9 Drawing Sheets

IMS NETWORK ACCESS USING LEGACY DEVICES

RELATED APPLICATIONS

This patent application claims priority to a foreign patent application filed in the Chinese Patent Office, having the application number 200510054440.6 and filed on Mar. 10, 2005.

BACKGROUND OF THE INVENTION

1. Field of the Invention

The invention is related to the field of communications, and in particular, to providing access to IMS networks and IMS services using legacy devices.

2. Statement of the Problem

As set forth in the $3^{rd}$ Generation Partnership Project (3GPP), an IP Multimedia Subsystem (IMS) provides a common core network having access-agnostic network architecture for converged networks. Service providers are accepting this architecture in next generation network evolution. The IMS architecture is initially defined by the 3GPP to provide multimedia services to mobile subscribers over an IP network. IP networks have become the most cost savings bearer network to transmit video, voice, and data. IMS uses the advantage of IP networks to provide multimedia services for IMS subscribers on an IMS platform. The signaling used within IMS networks is SIP protocol. IMS defines the standard SIP interface between application servers, the IMS core network (CSCF), the IMS subscriber, the IMS database (HSS), and IMS billing elements. These standards can reduce the network integration costs and let the subscriber enjoy more stable services.

On the IMS platform, the traditional supplementary services, such as call forwarding, conferencing, and call waiting could be available for IMS subscribers. Also, many new data services, such as instant messaging, video calls, video on wait, and web-based services, will also be available for the IMS subscribers.

An IMS subscriber uses an IMS device to access the IMS network and its associated IMS services over the IP network. Before the IMS services are available to the IMS subscriber, the IMS subscriber needs to register with the IMS network through the IMS device. The registration provides many functions in the IMS network, such as authenticating the subscriber, determining the services available to the subscriber, etc. The registration procedure is according to IMS standards. Thus, IMS-compliant devices are able to register with the IMS network to receive IMS services.

One problem with IMS networks as currently defined by the 3GPP is that legacy devices, such as traditional telephones, that do not register with the IMS networks are not able to access the IMS networks and IMS services. There are many legacy devices being used for communication that are not able to register with an IMS network. One type of legacy device is an H.323 IP device. H.323 IP devices do perform some registration when accessing a network, but the registration is not compliant with IMS standards. Another type of legacy device is a traditional telephone using the Public Switched Telephone Network (PSTN). Traditional phones are circuit-based and do not register with a network before use. There is currently no effective way for legacy devices to register with and access IMS networks and IMS services.

SUMMARY OF THE SOLUTION

The invention solves the above and other related problems by providing access to IMS networks using legacy devices. The invention advantageously allows IMS subscribers to use legacy devices to access IMS services, without the legacy devices having to perform IMS registration. IMS subscribers are not limited to mobile devices as defined by the 3GPP, but may use mobile devices, wire line devices, or any other legacy devices. Because many or most communication devices currently used are legacy devices, service providers will be able to offer IMS services to many more potential subscribers. Also, users that are comfortable with traditional telephones will have access to IMS services without having to use an IMS-compatible device, and will still be able to access to the traditional services.

One embodiment of the invention comprises a communication network that allows legacy devices access to an IMS network. The communication network includes a switching system, an IMS network, and a non-IMS network. The legacy device comprises any device not able to register with the IMS network. The legacy device allows a calling party to place a call over the communication network. The switching system includes a subscriber database that is pre-provisioned with identities of IMS subscribers using legacy devices in the communication network.

When in operation, a calling party places a call through the legacy device. The switching system receives the call from the legacy device. The call includes a calling party identifier that identifies the calling party. For instance, in a circuit-based call, the calling party identifier may comprise a telephone number that is included in the signaling (SS7, ISDN, etc) for the call. For a packet-based call, the calling party identifier may comprise a static IP address or a URL that is included in a header of the packets for the call. The switching system accesses the subscriber database based on the calling party identifier to determine if the calling party is an IMS subscriber. If the calling party is an IMS subscriber, then the switching system routes the call to the IMS network. If the calling party is not an IMS subscriber, then the switching system routes the call to the non-IMS network.

The invention may include other exemplary embodiments described below.

DESCRIPTION OF THE DRAWINGS

The same reference number represents the same element on all drawings.

DETAILED DESCRIPTION OF THE INVENTION

FIGS. 1-10 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
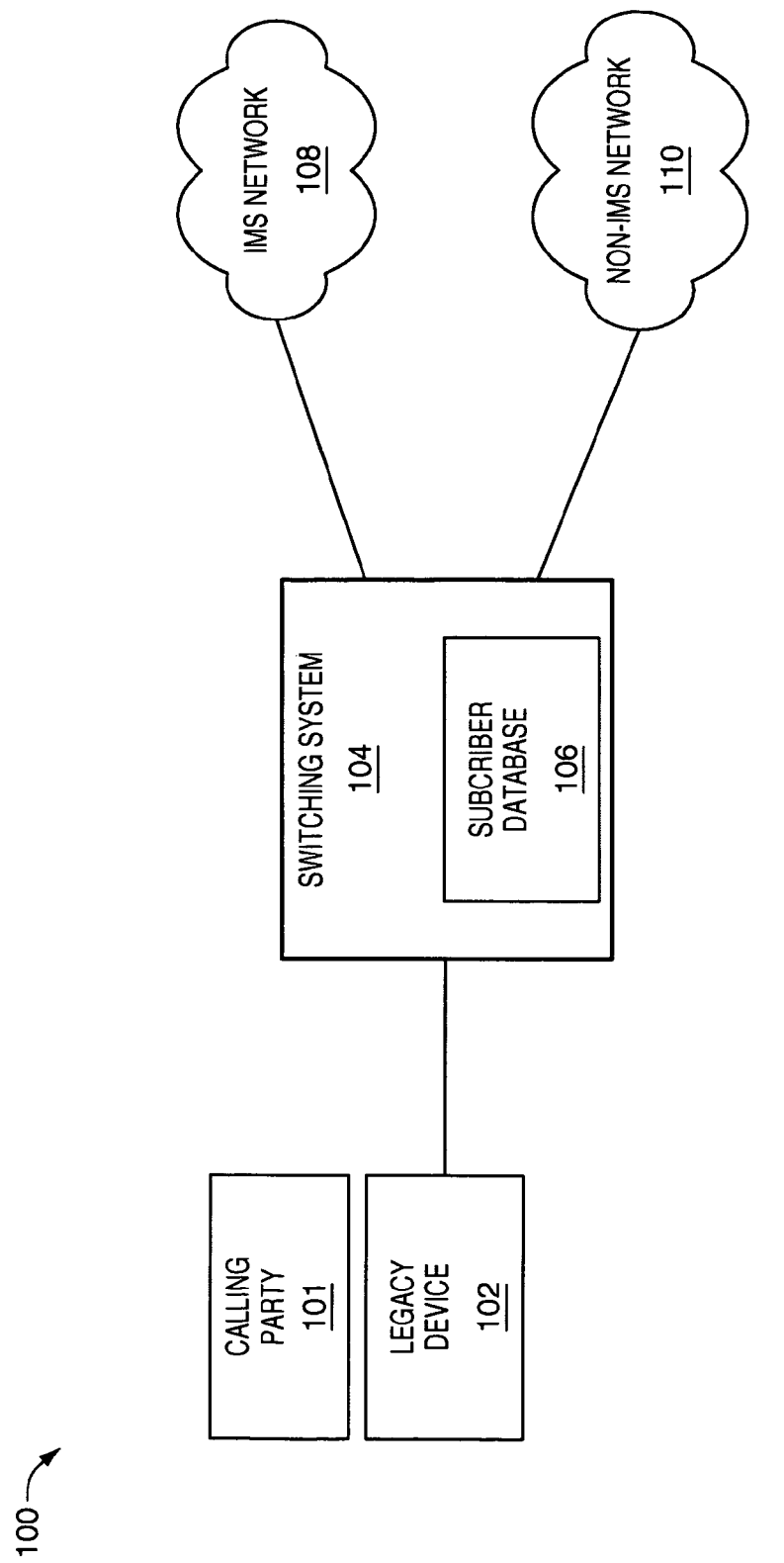
FIG. 1 illustrates a communication network in an exemplary embodiment of the invention.

FIG. 1 illustrates a communication network 100 in an exemplary embodiment of the invention. Communication network 100 includes a switching system 104, an IMS network 108, and a non-IMS network 110. Legacy device 102 accesses communication network 100 through switching system 104. Switching system 104 connects to IMS network 108, and non-IMS network 110. Switching system 104 includes a subscriber database 106 in this embodiment. Alternatively, subscriber database 106 may be remote from switching system 104 and accessible by switching system 104 over a network. Communication network 100 may include other devices, systems, or networks not shown in FIG. 1.

Legacy device 102 comprises any communication device that does not register with an IMS network. IMS-compliant devices as defined by the 3GPP are mobile devices that register with the IMS network. Legacy devices as defined herein are not IMS-compliant devices. Legacy devices may be mobile (or wireless) devices, or wire line devices (circuit-based or packet-based). One example of a legacy device 102 is a traditional telephone that communicates with a circuit-based network. A traditional telephone initiates a call with call signaling, such as SS7 signaling, ISDN signaling, etc. The traditional telephone does not register with the circuit-based network prior to placing a call, so it is not equipped or compatible to register with an IMS network. Another example of a legacy device 102 is a packet-based phone that does not register with an IMS network. Packet-based phones, such as VoIP phones using H.323 protocol, do register with networks, but the registration is not compliant with IMS standards.

To "register" with an IMS network means an IMS subscriber has a device that supports IMS-compliant SIP protocol that is used to register with the IMS network and service control. In the registration process, the IMS device transmits a SIP Register message to its related IMS Call Session Control Function (CSCF) element. The CSCF element queries the Home Subscriber Server (HSS) database to retrieve, check, and update the subscriber's registration information. The CSCF then downloads the service profile of the IMS subscriber. The IMS subscriber can use the IMS service anytime and anywhere. Each registration will have a limited time period. If the time period expires, the IMS subscriber needs to re-register to IMS network.

An IMS network 108 comprises any network that provides IMS services. An IMS network 108 may be defined by the 3GPP or any subsequent standards body. A non-IMS network 110 comprises any network that is not considered an IMS network. For instance, a non-IMS network 110 may comprise a public-switched telephone network (PSTN) or an IP network not providing IMS services.

Figure 2:
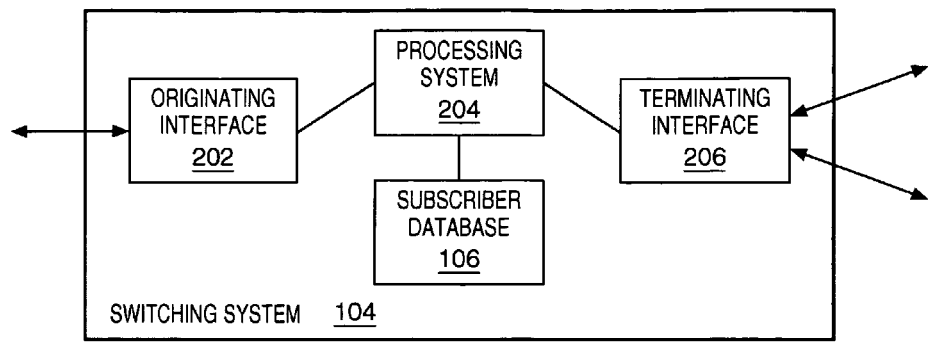
FIG. 2 illustrates a switching system in an exemplary embodiment of the invention.

FIG. 2 illustrates switching system 104 in an exemplary embodiment of the invention. Switching system 104 includes subscriber database 106, an originating interface 202, a processing system 204, and a terminating interface 206. Processing system 204 is connected to originating interface 202, terminating interface 206, and subscriber database 106. Originating interface 202 is operable to communicate with legacy device 102 (see FIG. 1). Terminating interface 206 is operable to communicate with IMS network 108 and non-IMS network 110 (see FIG. 1). Switching system 104 may comprise a soft switch, such as the Lucent Softswitch (LSS).

Processing system 204 may execute instructions that are stored on storage media (not shown) to perform the operations of switching system 104. The instructions can be retrieved and executed by processing system 204. Some examples of instructions are software, program code, and firmware. Some examples of storage media are memory devices, tape, disks, integrated circuits, and servers. The instructions are operational when executed by processing system 204 to direct processing system 204 to operate in accord with the invention. The term "processing system" refers to a single processing device or a group of inter-operational processing devices. Some examples of processors are computers, integrated circuits, and logic circuitry.

In FIG. 1, calling party 101 is using legacy device 102 to place a call. Although legacy device 102 does not register with IMS network 108, communication network 100 allows calling party 101 to access IMS network 108 and the IMS services according to the following method.

Figure 3:
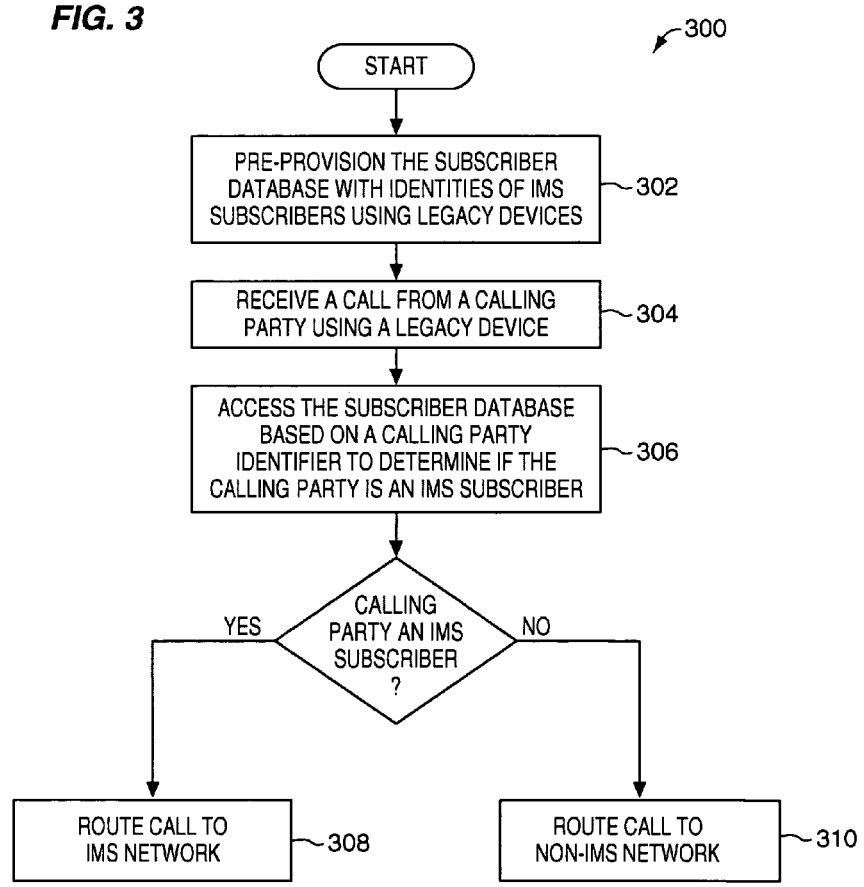
FIG. 3 is a flow chart illustrating a method of operating the communication network of FIG. 1 in an exemplary embodiment of the invention.

FIG. 3 is a flow chart illustrating a method 300 of operating communication network 100 of FIG. 1 in an exemplary embodiment of the invention. In step 302, subscriber database 106 is pre-provisioned with identities of IMS subscribers using legacy devices. Prior to placing calls, calling party 101 contacts a service provider and subscribes to IMS services offered by the service provider. The service provider pre-provisions subscriber database 106 and any other applicable subscriber databases. Subscriber database 106 stores the identities of IMS subscribers using legacy devices, including the identity of calling party 101. The identities of the IMS subscribers using legacy devices may comprise phone numbers (E164 numbers), IP addresses, URLs, or any other identifier for the IMS subscribers.

In step 304, switching system 104 receives a call from calling party 101 using legacy device 102. The call includes a calling party identifier that identifies calling party 101. For instance, in a circuit-based call, the calling party identifier may comprise a telephone number that is included in the signaling (SS7, ISDN, etc) for the call. For a packet-based call, the calling party identifier may comprise a static IP address or a URL that is included in a header of the packets for the call.

In step 306, switching system 104 accesses subscriber database 106 based on the calling party identifier to determine if calling party 101 is an IMS subscriber. Subscriber database 106 may be indexed with calling party identifiers for all of the IMS subscribers of the service provider that may be using legacy devices to access IMS network 108. Switching system 104 may enter the calling party identifier into subscriber database 106 to yield an indicator as to whether calling party 101 is an IMS subscriber. The indicator may be a true/false, a yes/no, or some other indicator.

If calling party 101 is an IMS subscriber, then switching system 104 routes the call to IMS network 108 in step 308. If calling party 101 is not an IMS subscriber, then switching system 104 routes the call to non-IMS network 110 in step 310.

Figure 4:
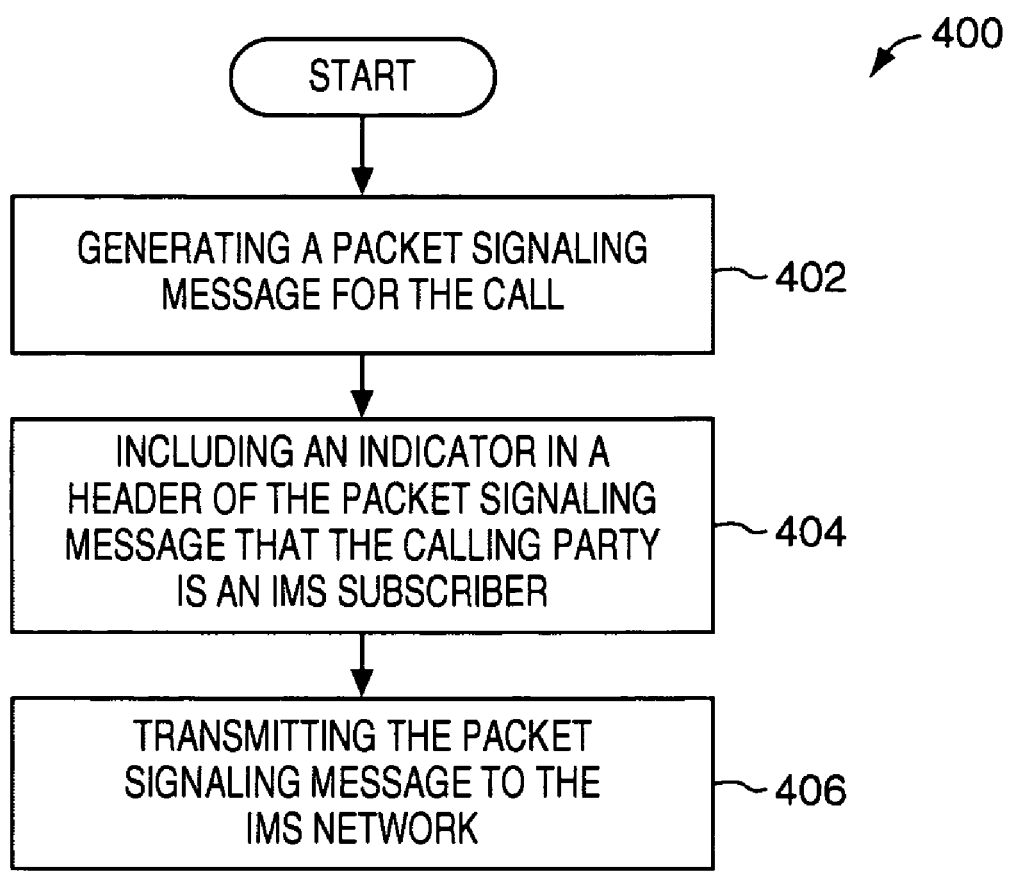
FIG. 4 is a flow chart illustrating a method of routing a call from the switching system to the IMS network in FIG. 1 in an exemplary embodiment of the invention.

FIG. 4 is a flow chart illustrating a method 400 of routing a call from switching system 104 to IMS network 108 in FIG. 1 in an exemplary embodiment of the invention. In step 402, switching system 104 generates a packet signaling message for the call. For instance, if switching system 104 uses SIP to communicate with IMS network 108, then switching system 104 generates a SIP INVITE message for the call. In step 404, switching system 104 includes or inserts an indicator in a header of the packet signaling message that calling party 101 is an IMS subscriber. Assume again that SIP is being used. Switching system 104 may include an indicator in the header of the SIP INVITE message that the call is originated by an IMS subscriber using a legacy device. The indicator may be inserted in an existing field of the header of the SIP INVITE message, or a new field may be designated for the indicator. In step 406, with the packet signaling message formatted, switching system 104 transmits the packet signaling message to IMS network 108. IMS network 108 may then process the packet signaling message. IMS network 108 may process the indicator in the header of the packet signaling message to identify a service profile for calling party 101. IMS network 108 may process the indicator in the header of the packet signaling message to identify a serving-call session control function (S-CSCF) for the call.

Communication network 100 advantageously allows IMS subscribers to use legacy devices to access IMS networks, without the legacy devices having to perform IMS registration. IMS subscribers are not limited to mobile devices as defined by the 3GPP, but may use mobile devices, wire line devices, or any other legacy devices. Because many or most communication devices currently used are legacy devices, service providers will be able to offer IMS services to many more potential subscribers. Also, users that are comfortable with traditional telephones will have access to IMS services without having to use an IMS-compatible device, and will still be able to access the traditional services.

FIGS. 5-9 illustrate particular examples of how a call would be handled by a communication network according to the invention.

Figure 5:
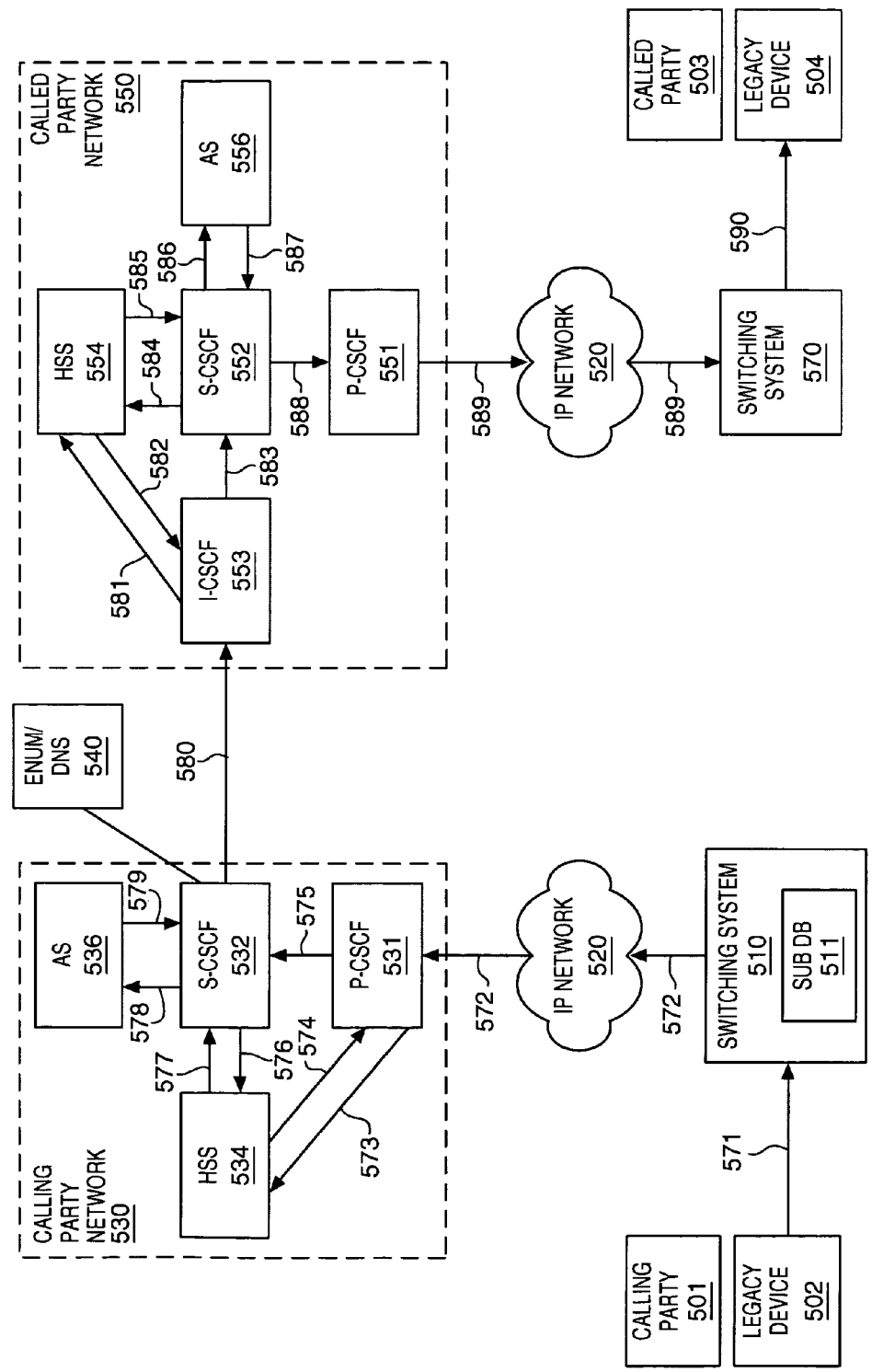
FIGS. 5-9 illustrate call flows through a communication network in exemplary embodiments of the invention.

FIG. 5 illustrates a call flow in a communication network 500 in an exemplary embodiment of the invention. Communication network 500 includes switching systems 510 and 570, IP network 520, calling party network 530, called party network 550, and telephone numbering mapping (ENUM)/domain name server (DNS) database 540. Switching systems 510 and 570 may comprise Lucent Softswitches (LSS) or another type of switches. Calling party network 530 includes a Proxy-Call Server Control Function (P-CSCF) 531, a Serving-CSCF (S-CSCF) 532, a Home Subscriber Server (HSS) 534, and one or more Application Servers (AS) 536. Called party network 550 includes an Interrogate-CSCF (I-CSCF) 553, an S-CSCF 552, a P-CSCF 551, an HSS 554, and one or more Application Servers (AS) 556. Communication network 500 may include other systems, servers, and networks not shown in FIG. 5.

For this embodiment, a calling party 501 (through a legacy device 502) is placing a call to a called party 503 (through a legacy device 504). Assume that both calling party 501 and called party 503 are IMS subscribers using legacy devices. Calling party 501 dials a number through legacy device 502 for called party 503 to place a call in communication network 500. Switching system 510 receives the call from legacy device 502 (arrow 571). Switching system 510 accesses subscriber database (SUB DB) 511 to determine whether calling party 501 is an IMS subscriber. Subscriber database 511 is pre-provisioned with identities of IMS subscribers, such as telephone numbers or URLs. For each identity, subscriber database 511 also includes an IMS field indicating whether that party is an IMS subscriber. If the IMS field is set to "true", then the party is an IMS subscriber. If the IMS field is set to "false", then the party is not an IMS subscriber. Calling party 501 is an IMS subscriber in this embodiment, so switching system 510 determines that calling party 501 is an IMS subscriber. Switching system 510 also determines whether called party 503 is an IMS subscriber.

Switching system 510 then routes the call to P-CSCF 531 over IP network 520 by transmitting a SIP INVITE message to P-CSCF 531 (arrow 572). Switching system 510 includes or inserts an indicator in the header of the SIP INVITE message that calling party 501 is an IMS subscriber. A new field may be added to the INVITE message to accommodate the indicator. Switching system 510 also includes an indicator in the header that called party 503 is an IMS subscriber.

When P-CSCF 531 receives the INVITE message, P-CSCF 531 checks the INVITE message header to determine if calling party 501 is an IMS subscriber. Because the indicator in the header indicates that calling party 501 is an IMS subscriber, P-CSCF 531 checks if there is a mapping existing for calling party 501 to route the call to the related S-CSCF 532. If no mapping exists, P-CSCF 531 queries HSS 534 with a Location Information Request (LIR) with a number for calling party 501 (arrow 573). HSS 534 processes the LIR and determines that S-CSCF 532 will be serving the call. The S-CSCF's are pre-provisioned in HSS 534 for IMS subscribers using legacy devices. HSS 534 selects S-CSCF 532 based on the number for calling party 501, and transmits a Location Information Answer (LIA) to P-CSCF 531 with the information on S-CSCF 532 (arrow 574). P-CSCF 531 enters the number for calling party 501 and the information on S-CSCF 532 for calling party 501 into a mapping table (not shown). P-CSCF 531 retrieves the address of S-CSCF 532 from the mapping table, and transmits the INVITE message to S-CSCF 532 (arrow 575).

S-CSCF 532 checks the INVITE message header to determine if calling party 501 is an IMS subscriber. Because the indicator in the header indicates that calling party 501 is an IMS subscriber, S-CSCF 532 determines if a service profile for calling party 501 is already downloaded from HSS 534. If the service profile is not already downloaded, S-CSCF 532 transmits a service assignment request (SAR) for the service profile to HSS 534 (arrow 576). HSS 534 identifies the service profile for calling party 501, and transmits a service assignment answer (SAA) to S-CSCF 532 that includes the service profile for calling party 501 (arrow 577). S-CSCF 532 may store the service profile for calling party 501 locally. For performance consideration, the service profile may be kept for a while and if no more calls are made from the same calling party 501 after a pre-defined period of time, S-CSCF 532 will clear the service profile and download the data again if a new call is made from calling party 501.

S-CSCF 532 analyzes the service profile of calling party 501 and determines whether to trigger AS 536. If S-CSCF 532 determines that AS 536 is to be triggered, then S-CSCF 532 transmits the INVITE message to AS 536 (arrow 578). AS 536 checks the service of calling party 501 and transmits the INVITE message back to S-CSCF 532 (arrow 579). When AS 536 transmits the INVITE message back to S-CSCF 532, S-CSCF 532 may take three possible options to transmit the INVITE message to called party network 550.

First, S-CSCF 532 may query ENUM/DNS database 540 with the number of called party 503 to get a URL for called party 503. S-CSCF 532 may then determine the address of I-CSCF 553 based on the URL for called party 503. S-CSCF 532 can then transmit the INVITE message to I-CSCF 553 based on the determined address.

Second, if the number of called party 503 is an E164 number and S-CSCF 532 cannot get the URL for called party 503, then S-CSCF 532 may route the INVITE message to a Break out Gateway Control Function (BGCF) (not shown). The BGCF may then route the INVITE message to I-CSCF 553 based on a routing table provisioned for the BGCF.

Third, S-CSCF 532 may directly transmit the INVITE message to a pre-arranged I-CSCF 553.

Responsive to receiving the INVITE message (arrow 580), I-CSCF 553 transmits an LIR for called party 503 to HSS 554

(arrow 581). Because called party 503 is also an IMS subscriber, an S-CSCF 552 is pre-provisioned in HSS 554 for called party 503. HSS 554 processes the LIR and determines the S-CSCF 552 for called party 503. HSS 554 transmits a LIA to I-CSCF 553 with the information on S-CSCF 552 (arrow 582). I-CSCF 553 then transmits the INVITE message to S-CSCF 552 (arrow 583).

S-CSCF 552 receives the INVITE message and checks the INVITE message header to determine if called party 503 is an IMS subscriber. Because the indicator in the header indicates that called party 503 is an IMS subscriber, S-CSCF 552 determines if a service profile already exists for called party 503. If the service profile is not already downloaded, S-CSCF 552 transmits a SAR for the service profile to HSS 554 (arrow 584). HSS 554 identifies the service profile for called party 503, and transmits an SAA to S-CSCF 552 that includes the service profile for called party 503 (arrow 585). S-CSCF 552 may store the service profile for called party 503 locally. For performance consideration, the service profile may be kept for a while and if no more calls are made to the same called party 503 after a pre-defined period of time, S-CSCF 552 will clear the service profile and download the data again if a new call is made to called party 503.

S-CSCF 552 analyzes the service profile of called party 503 and determines whether to trigger AS 556. If S-CSCF 552 determines that AS 556 is to be triggered, then S-CSCF 552 transmits the INVITE message to AS 556 (arrow 586). AS 556 checks the service of called party 503 and transmits the INVITE message back to S-CSCF 552 (arrow 587). S-CSCF 552 then transmits the INVITE message to P-CSCF 551 (arrow 588).

P-CSCF 551 enters S-CSCF 552 and called party 503 into its mapping table (not shown) if not yet existing. P-CSCF 551 then transmits the SIP INVITE message to switching system 570 through IP network 520 (arrow 589). Switching system 570 then routes the call to legacy device 504 (arrow 590). The subsequent call flow follows the standard IMS call flow.

Figure 6:
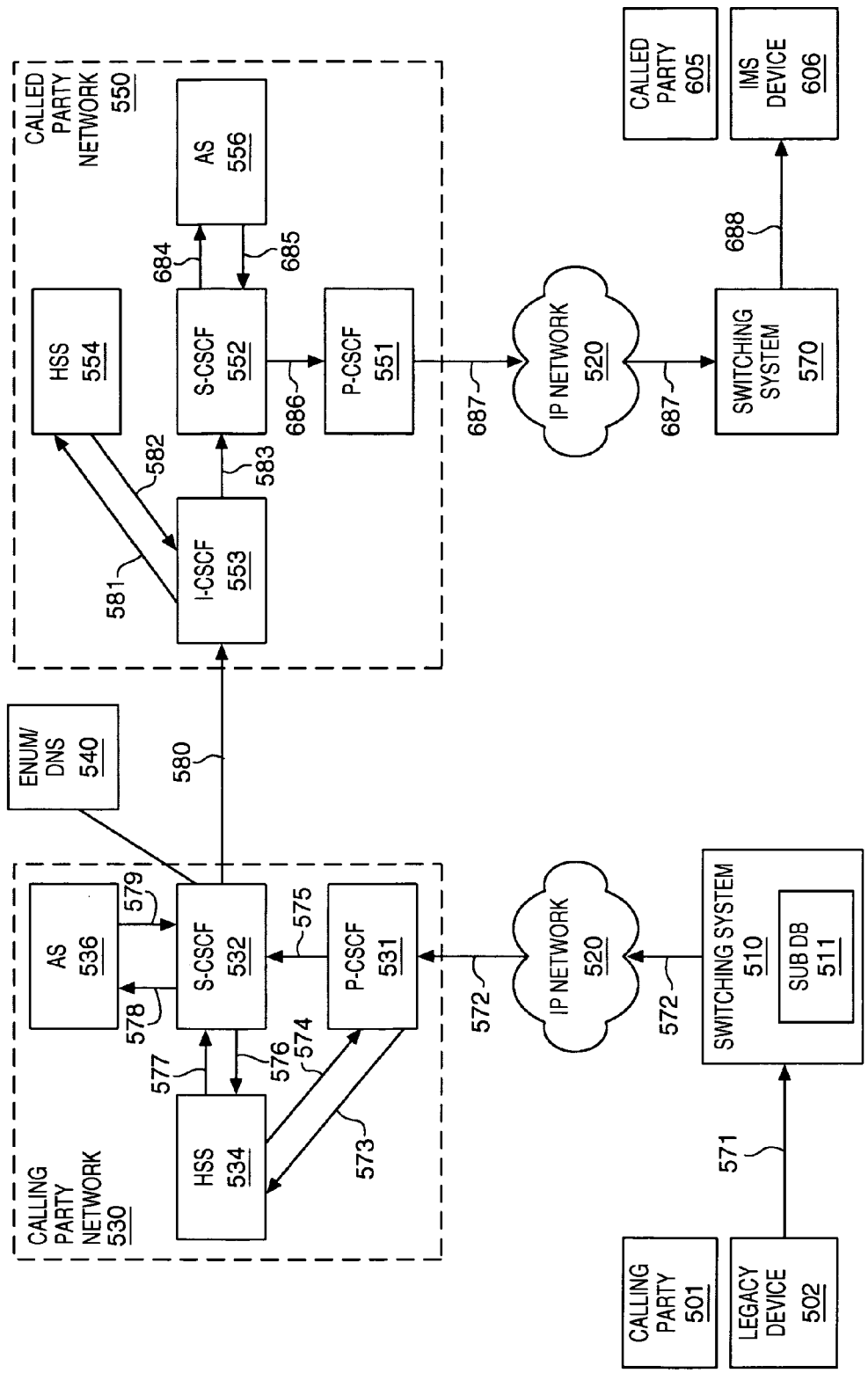

FIG. 6 illustrates another call flow in communication network 500 in an exemplary embodiment of the invention. In this embodiment, calling party 501 (through legacy device 502) is placing a call to a called party 605 (through an IMS device 606). Assume again that both calling party 501 and called party 605 are IMS subscribers, but called party 605 is using an IMS-compliant device instead of a legacy device as in FIG. 5. The same process occurs as described above until S-CSCF 552 receives the SIP INVITE message (arrows 571-583). When S-CSCF 552 receives the INVITE message, S-CSCF 552 checks the INVITE message header to determine if called party 605 is an IMS subscriber. In this case, called party 605 is an IMS subscriber, so S-CSCF 552 uses the service profile that was already downloaded from HSS 554 during registration of called party 605. S-CSCF 552 analyzes the service profile of called party 605 and determines whether to trigger AS 556. If S-CSCF 552 determines that AS 556 is needed, then S-CSCF 552 transmits the INVITE message to AS 556 (arrow 684). AS 556 checks the terminating service of called party 605, and returns a proper message to S-CSCF 552 (arrow 685). S-CSCF 552 then transmits the INVITE message to P-CSCF 551 (arrow 686).

P-CSCF 551 then transmits the SIP INVITE message to switching system 570 through IP network 520 (arrow 687). Switching system 570 then routes the call to IMS device 606 (arrow 688). The subsequent call flow follows the standard IMS call flow.

Figure 7:
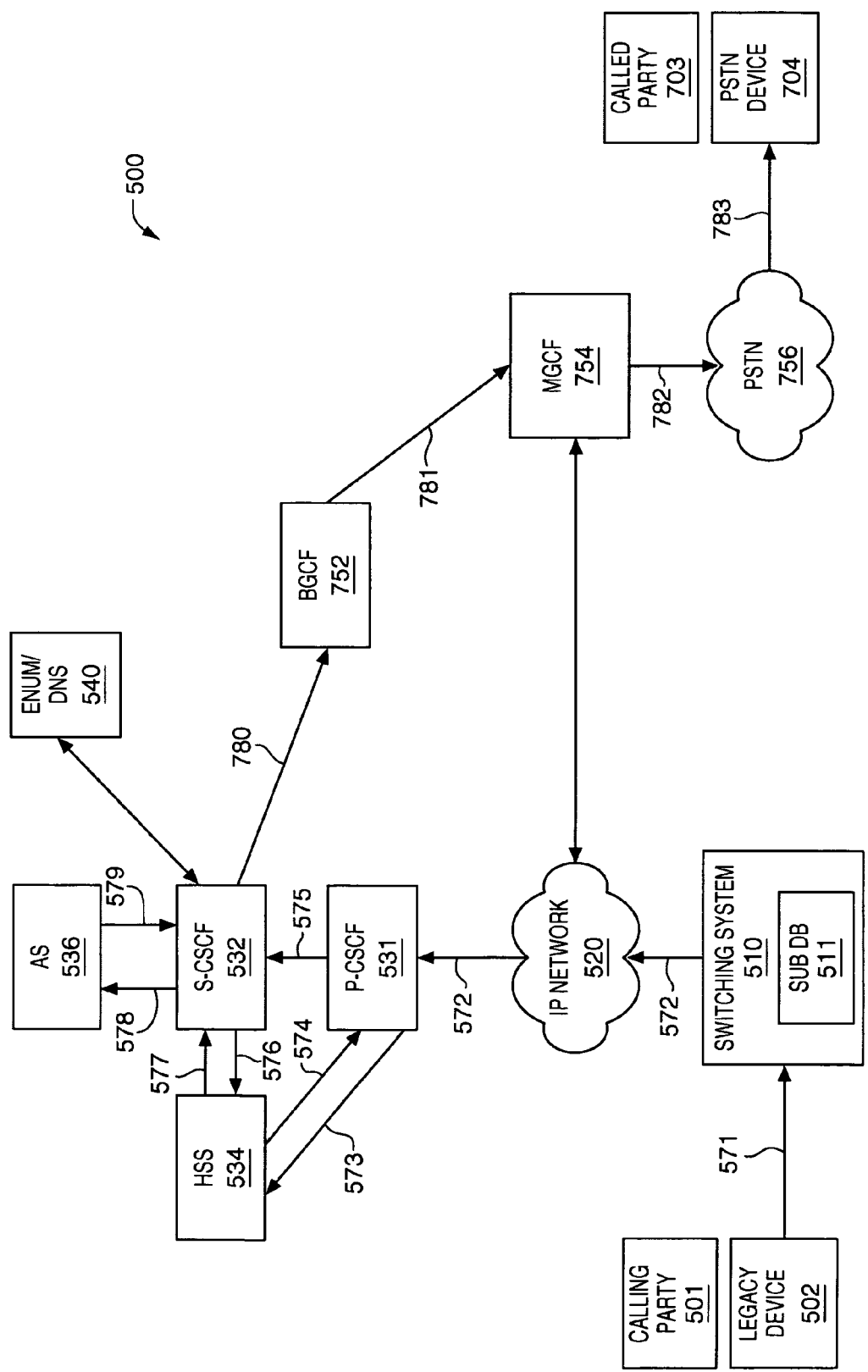

FIG. 7 illustrates another call flow for communication network 500 in an exemplary embodiment of the invention. For this embodiment, communication network 500 further includes a Break out Gateway Control Function (BGCF) 752, a Media Gateway Control Function (MGCF) 754, and a PSTN 756.

Calling party 501 (through legacy device 502) is placing a call to a called party 703 (through a PSTN device 704). Assume that calling party 501 is an IMS subscriber and called party 703 is not an IMS subscriber but is a traditional PSTN subscriber. The same process occurs as described in FIG. 5 until S-CSCF 552 queries ENUM/DNS database 540 with the E164 number of called party 703 to get the URL address of called party 703 (arrows 571-579). S-CSCF 552 queries ENUM/DNS database 540 with the E164 number of called party 703 to get the URL address of called party 703. In this case, the PSTN number of called party 703 does not have an associated URL. Therefore, S-CSCF 532 determines that the call should be terminated to PSTN 756. S-CSCF 532 then transmits the INVITE message to BGCF 752 (arrow 780). BGCF 752 transmits the INVITE message to an available MGCF 754 based on a provisioned routing table (arrow 781). MGCF 754 performs any protocol conversion, and routes the call to PSTN 756 based on a routing table (arrow 782). PSTN 765 routes the call to PSTN device 704 (arrow 783).

Figure 8:
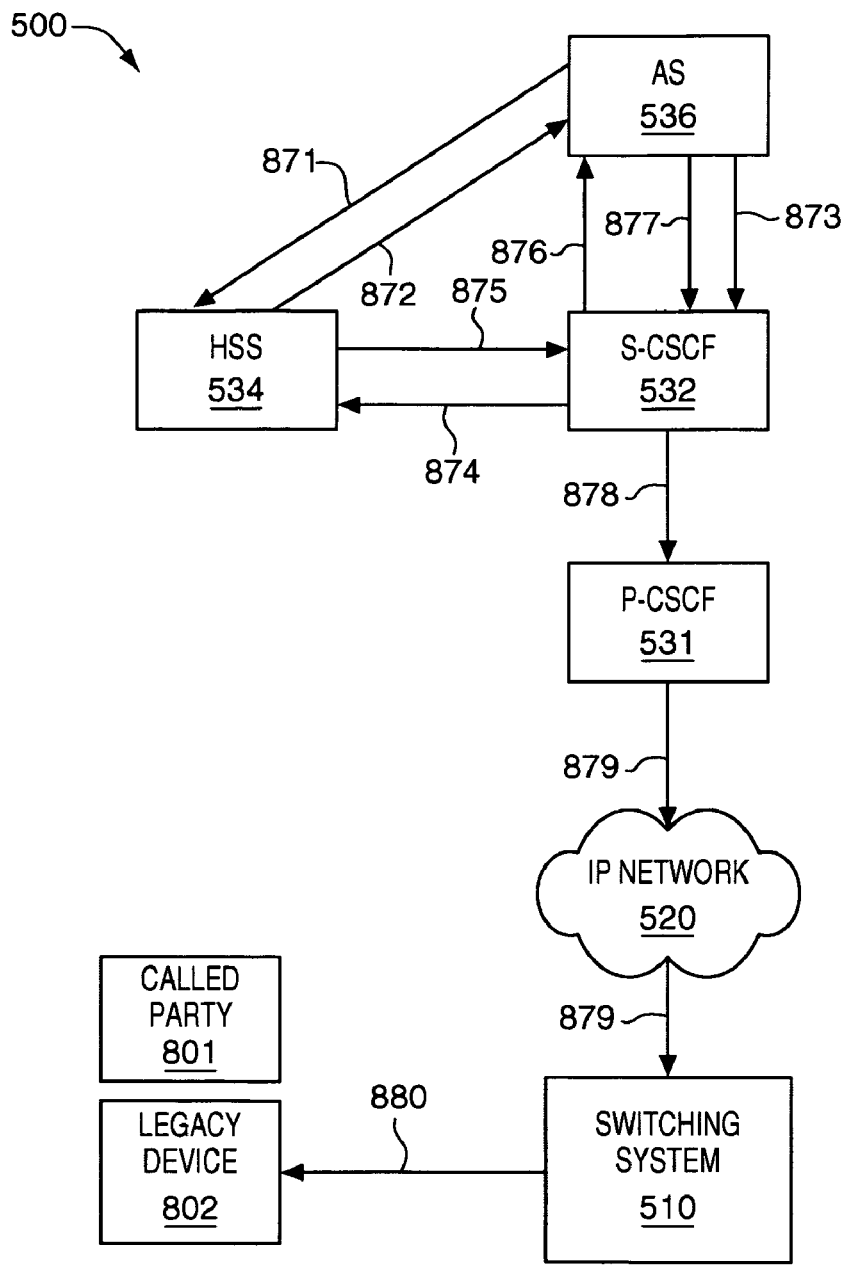

FIG. 8 illustrates another call flow for communication network 500 in an exemplary embodiment of the invention. For this embodiment, AS 536 initiates a call to called party 801 through legacy device 802. Assume that called party 801 is an IMS subscriber.

AS 536 queries HSS 534 to get the identity of the S-CSCF 532 responsible for called party 801 (arrow 871). HSS 534 determines the S-CSCF 532 for called party 801 and transmits information on S-CSCF 532 to AS 536 (arrow 872). AS 536 transmits a SIP INVITE message to S-CSCF 532 (arrow 873). AS 536 includes an indicator in the header of the INVITE message that called party 801 is an IMS subscriber. When S-CSCF 532 receives the INVITE message from AS 536, S-CSCF 532 checks the header to determine if called party 801 is an IMS subscriber. Because the indicator in the header indicates that called party 801 is an IMS subscriber, S-CSCF 532 determines if a service profile for called party 801 is already downloaded from HSS 534. If the service profile is not already downloaded, S-CSCF 532 transmits an SAR for the service profile to HSS 534 (arrow 874). HSS 534 identifies the service profile for called party 801, and transmits an SAA to S-CSCF 532 that includes the service profile for called party 801 (arrow 875). S-CSCF 532 may store the service profile for called party 801 locally. For performance consideration, the service profile may be kept for a while and if no more calls are made to the same called party 801 after a pre-defined period of time, S-CSCF 532 will clear the service profile and download the data again if a new call is made to called party 801.

S-CSCF 532 analyzes the service profile of called party 801 and determines whether to trigger AS 536. If S-CSCF 532 determines that AS 536 is needed, then S-CSCF 532 transmits the INVITE message to AS 536 (arrow 876). AS 536 checks the service of called party 801 and transmits the INVITE message back to S-CSCF 532 (arrow 877).

S-CSCF 532 then routes the INVITE message to P-CSCF 531 (arrow 878). P-CSCF 531 then transmits the INVITE message to switching system 510 through IP network 520 (arrow 879). Switching system 510 routes the call to legacy device 802 (arrow 880). The subsequent call flow follows the standard IMS call flow.

Figure 9:
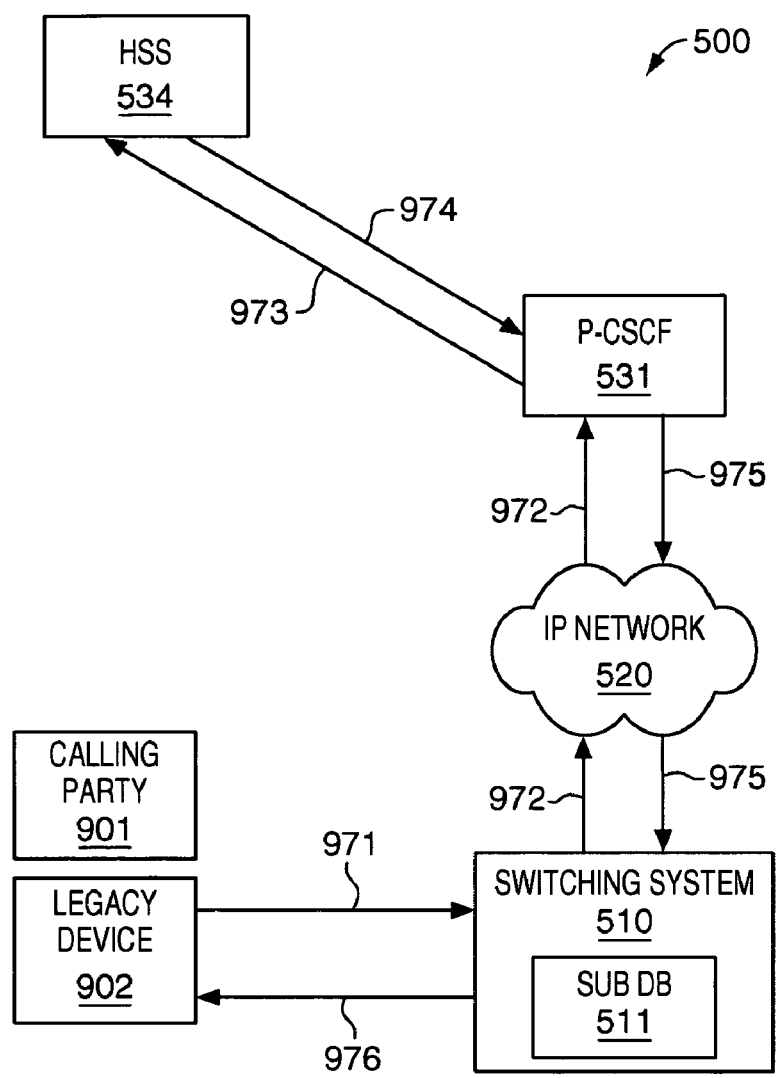

FIG. 9 illustrates another call flow for communication network 500 in an exemplary embodiment of the invention. For this embodiment, a calling party 901 makes an unauthorized call through a legacy device 902, and the call is rejected by P-CSCF 531. Assume that calling party 901 is an IMS subscriber.

Calling party 901 dials a number through legacy device 902 to place a call in communication network 500. Switching system 510 receives the call from legacy device 902 (arrow 971). Switching system 510 accesses subscriber database 511 to determine whether calling party 901 is an IMS subscriber. Because switching system 510 determines that calling party 901 is an IMS subscriber, switching system 510 routes the call to P-CSCF 531 over IP network 520 by transmitting a SIP INVITE message to P-CSCF 531 (arrow 972). Switching system 510 includes an indicator in the header of the SIP INVITE message that calling party 901 is an IMS subscriber. A new field may be added to the INVITE message to accommodate the indicator.

When P-CSCF 531 receives the INVITE message, P-CSCF 531 checks the INVITE message header to determine if calling party 901 is an IMS subscriber. Because the indicator in the header indicates that calling party 901 is an IMS subscriber, P-CSCF 531 checks if there is a mapping existing for calling party 901 to route the call to the related S-CSCF 532. If no mapping exists, P-CSCF 531 queries HSS 534 with an LIR with a number for calling party 901 (arrow 973). P-CSCF 531 receives an LIA from HSS 534 (arrow 974). P-CSCF 531 checks the LIA to see if the call should be rejected (e.g., there is no S-CSCF provisioned for calling party 901, or HSS 534 returned an error message). P-CSCF 531 transmits the proper SIP message to switching system 510 to reject the call (arrow 975). Switching system 510 transmits this message to legacy device 902 with the proper signaling (arrow 976).

Figure 10:
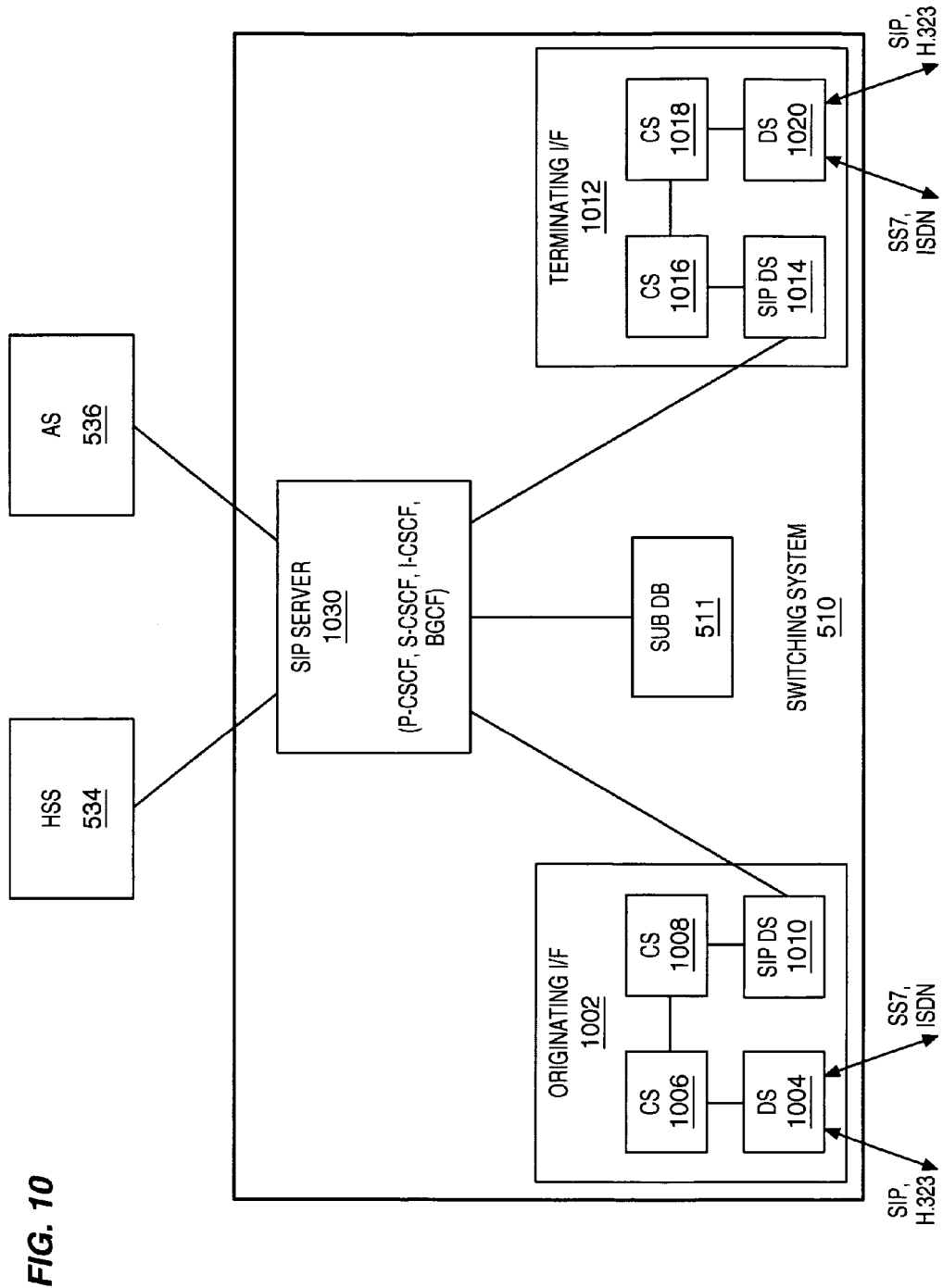
FIG. 10 illustrates another switching system in an exemplary embodiment of the invention.

FIG. 10 illustrates switching system 510 in an exemplary embodiment of the invention. One example of switching system 510 is a Lucent Softswitch (LSS). Switching system 510 includes an originating interface (I/F) 1002 having a device server (DS) 1004 and a call server (CS) 1006 for the originating end point. The originating interface 1002 also includes a call server (CS) 1008 and a SIP device server (SIP DS) 1010 for the application servers. Switching system 510 also includes a terminating interface 1012 having a SIP device server (SIP DS) 1014 and a call server (CS) 1016 for the application servers. The terminating interface 1012 also includes a call server (CS) 1018 and a device server (DS) 1020 for the terminating end point. Switching system 510 further includes subscriber database 511, and a SIP server 1030. SIP server 1030 communicates with HSS 534 and AS 536 (see FIG. 5). SIP server 1030 includes the functionality for a P-CSCF, an S-CSCF, an I-CSCF, a BGCF, etc.

When an IMS subscriber places a call, switching system 510 receives the call through device server 1004. Call server 1006 accesses the subscriber database 511 to determine if calling party is an IMS subscriber. If the calling party is not an IMS subscriber, then call server 1006 routes the call normally as a wire line call without invoking SIP server 1030 and AS 536. If the calling party is an IMS subscriber, then call server 1006 routes the call to SIP server 1030 via SIP device server 1010.

SIP server 1030 runs the CSCF functionality, queries HSS 534 for a service profile of the calling party, invokes AS 536, and routes the call to SIP device server 1014 via either the P-CSCF (when the called party is another IMS subscriber) or the BGCF (when the called party is a PSTN subscriber).

We claim:

1. A system, comprising:
a switching system that serves a legacy device which is not able to register with an IP Multimedia Subsystem (IMS) network, wherein the switching system is within a circuit-switched legacy network and outside of the IMS network;
the switching system receives a call from a calling party using the legacy device to a called party, and determines where to route the call based on whether the calling party is an IMS subscriber using a legacy device;
if the calling party is an IMS subscriber using a legacy device, then the switching system routes signaling for the call to the IMS network so that the calling party is able to access IMS services through the legacy device even though the legacy device does not perform IMS registration; and
if the calling party is not an IMS subscriber using a legacy device, then the switching system routes the signaling for the call to a non-IMS network.

2. The system of claim 1 further comprising:
a subscriber database that stores identities of IMS subscribers that use legacy devices which are not able to register with the IMS network.

3. The system of claim 2 wherein:
the switching system determines an identifier for the calling party, and accesses the subscriber database based on the calling party identifier to determine if the calling party is an IMS subscriber using a legacy device.

4. The system of claim 2 wherein the subscriber database is pre-provisioned with the identities indicating whether IMS subscribers are using legacy devices.

5. The system of claim 1 wherein the switching system, in order to route the call to the IMS network, generates a packet signaling message for the call, includes an indicator in a header of the packet signaling message that the calling party is an IMS subscriber, and transmits the packet signaling message to the IMS network.

6. The system of claim 5 wherein the IMS network processes the indicator in the header of the packet signaling message to identify a service profile for the calling party and to identify a serving-call session control function (CSCF) for the call.

7. The system of claim 5 wherein the packet signaling message comprises a Session Initiation Protocol (SIP) message.

8. The system of claim 1 wherein the IMS network determines if the called party is an IMS subscriber, and routes the signaling for the call to a non-IMS network if the called party is not an IMS subscriber.

9. The system of claim 8 wherein the IMS network routes the signaling for the call to a call session control function (CSCF) for the called party if the called party is an IMS subscriber.

10. A method of operating a communication network for providing a legacy device access to an IP Multimedia Subsystem (IMS) network, the method comprising:
receiving a call from a calling party using a legacy device to a called party into a switching system, wherein the switching system is within a circuit-switched legacy network and outside of the IMS network;
determining where to route the call based on whether the calling party is an IMS subscriber using a legacy device
routing the signaling for the call from the switching system to the IMS network if the calling party is an IMS subscriber using a legacy device so that the calling party is able to access IMS services through the legacy device even though the legacy device does not perform IMS registration; and routing the signaling for the call from the switching system to a non-IMS network if the calling party is not an IMS subscriber using a legacy device.

11. The method of claim 10 further comprising:

storing, in a subscriber database, identities of IMS subscribers that use legacy devices which are not able to register with the IMS network.

12. The method of claim 11 further comprising:

determining an identifier for the calling party; and accessing the subscriber database based on the calling party identifier to determine if the calling party is an IMS subscriber using a legacy device.

13. The method of claim 11 further comprising:

pre-provisioning the subscriber database with the identities indicating whether IMS subscribers are using legacy devices.

14. The method of claim 10 wherein routing the signaling for the call from the switching system to the IMS network comprises:

generating a packet signaling message for the call;

including an indicator in a header of the packet signaling message that the calling party is an IMS subscriber; and transmitting the packet signaling message from the switching system to the IMS network.

15. The method of claim 14 further comprising:

processing the indicator in the header of the packet signaling message in the IMS network to identify a service profile for the calling party and to identify a serving-call session control function (CSCF) for the call.

16. The method of claim 10 further comprising:

determining in the IMS network if the called party is an IMS subscriber, and routing the signaling for the call from the IMS network to a non-IMS network if the called party is not an IMS subscriber.

17. The method of claim 16 further comprising:

routing the signaling for the call from the IMS network to a call session control function (CSCF) for the called party if the called party is an IMS subscriber.

18. A communication network, comprising:

a calling party IP Multimedia Subsystem (IMS) network;

a subscriber database that stores identities of IMS subscribers that use legacy devices which are not able to register with the IMS network; and a switching system that serves a legacy device which is not able to register with the calling party IMS network, wherein the switching system is within a circuit-switched legacy network and outside of the IMS network;

the switching system receives a call from a calling party using the legacy device to a called party, accesses the subscriber database based on a calling party identifier to determine where to route the call based on whether the calling party is an IMS subscriber using a legacy device, routes signaling for the call to the calling party IMS network if the calling party is an IMS subscriber using a legacy device so that the calling party is able to access IMS services even though the legacy device does not perform IMS registration, and routes the signaling for the call to a non-IMS network if the calling party is not an IMS subscriber;

the calling party IMS network receives the call, determines if the called party is an IMS subscriber, and routes the signaling for the call to the non-IMS network if the called party is not an IMS subscriber.

19. The communication network of claim 18 wherein the calling party IMS network routes the signaling for the call to a Break out Gateway Control Function (BGCF) if the called party is not an IMS subscriber.

20. The communication network of claim 18 wherein the calling party IMS network routes the signaling for the call to a called party IMS network if the called party is an IMS subscriber.

* * * * *

UNITED STATES PATENT AND TRADEMARK OFFICE
CERTIFICATE OF CORRECTION

| | | |
|---|---|---|
| PATENT NO. | : 8,046,381 B2 | Page 1 of 1 |
| APPLICATION NO. | : 11/114258 | |
| DATED | : October 25, 2011 | |
| INVENTOR(S) | : Cai et al. | |

It is certified that error appears in the above-identified patent and that said Letters Patent is hereby corrected as shown below:

In column 4 line 39, the text "a static EP" should read --a static IP--.

Signed and Sealed this
Twentieth Day of December, 2011

David J. Kappos
*Director of the United States Patent and Trademark Office*